United States Patent
Shao et al.

(10) Patent No.: US 8,774,733 B2
(45) Date of Patent: Jul. 8, 2014

(54) METHOD AND SYSTEM FOR POWER SAVING IN WIRELESS COMMUNICATIONS

(75) Inventors: Huai-Rong Shao, Santa Clara, CA (US); Chiu Ngo, San Francisco, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 825 days.

(21) Appl. No.: 12/508,057

(22) Filed: Jul. 23, 2009

(65) Prior Publication Data

US 2010/0112960 A1    May 6, 2010

Related U.S. Application Data

(60) Provisional application No. 61/110,849, filed on Nov. 3, 2008.

(51) Int. Cl.
*H04B 1/38* (2006.01)
(52) U.S. Cl.
USPC .............................. 455/73; 455/574; 370/318
(58) Field of Classification Search
None
See application file for complete search history.

(56) References Cited

U.S. PATENT DOCUMENTS

| | | | |
|---|---|---|---|
| 7,266,085 B2* | 9/2007 | Stine | 370/252 |
| 7,710,939 B2 | 5/2010 | Shao et al. | |
| 8,036,719 B2* | 10/2011 | Ying | 455/574 |
| 8,064,411 B2* | 11/2011 | Ecclesine | 370/337 |
| 8,064,828 B2* | 11/2011 | Maltsev et al. | 455/41.2 |
| 2004/0235536 A1* | 11/2004 | Kim et al. | 455/574 |
| 2005/0143145 A1* | 6/2005 | Maekawa | 455/574 |
| 2006/0292996 A1* | 12/2006 | Malasani et al. | 455/78 |
| 2008/0130540 A1 | 6/2008 | Singh et al. | |
| 2008/0181156 A1* | 7/2008 | Ecclesine | 370/311 |
| 2010/0056229 A1* | 3/2010 | Ying | 455/574 |

OTHER PUBLICATIONS

IEEE 802.15.3c standard, 2003, pp. 52 and 68.*
IEEE Computer Society, "IEEE P802.15.3c/D02 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, 2008, pp. i-192, New York, United States.
Simunic, T., "Power Saving Techniques for Wireless LANs", Proceedings of the Conference on Design, Automation and Test in Europe (DATE '05), vol. 3, IEEE, 2005, pp. 1-2, United States.

* cited by examiner

*Primary Examiner* — Fayyaz Alam
*Assistant Examiner* — Mohammed Rachedine
(74) *Attorney, Agent, or Firm* — Kenneth L. Sherman, Esq.; Michael Zarrabian, Esq.; Sherman & Zarrabian LLP

(57) ABSTRACT

A method and system for power saving communication in a wireless network is provided. One implementation involves establishing a wireless bus between two electronic wireless stations, and at a receiving wireless station receiving an incoming wireless signal from a wireless transmitting station via a wireless communication medium, initiating processing the signal for detecting if the signal comprises a wireless bus tracking signal, and if the signal comprises a wireless bus tracking signal, then ceasing further processing of the signal to conserve power.

32 Claims, 5 Drawing Sheets

METHOD AND SYSTEM FOR POWER SAVING IN WIRELESS COMMUNICATIONS

RELATED APPLICATION

This application claims priority from U.S. Provisional Patent Application Ser. No. 61/110,849, filed on Nov. 3, 2008, incorporated herein by reference.

FIELD OF THE INVENTION

The present invention relates to providing access to wireless communications and in particular to wireless bus communications.

BACKGROUND OF THE INVENTION

Wireless bus communication applications have several unique requirements compared to other wireless communication applications. In wireless bus communication between wireless stations (transmitter and receiver), data packets need to be transmitted in a very short time over a wireless communication medium (e.g., radio frequency). Low-latency is a major requirement for supporting wireless bus applications. Further, the wireless connection between the transmitter and the receiver needs to be kept alive, even when no data is transmitted. Otherwise, data packet transmission latency can be very long due to connection setup or re-connection. In addition, data packets may be very small for wireless bus applications and the data arrival from the application layer may be bursty and random.

For wired bus (not wireless) communication applications, it can be easily determined if the bus is alive by detecting the power level of the communication wire at either the transmitter side or the receiver side. However, for wireless bus communication applications, it is difficult to determine if the bus is alive because there is no physical wire between the transmitter and the receiver. The only way to maintain the connection between the transmitter and the receiver is to keep exchanging wireless signals between them. However, such exchange of signals is costly in terms of power consumption at both the transmitter and the receiver.

BRIEF SUMMARY OF THE INVENTION

The present invention provides a method and system for power saving communication in a wireless network. One implementation involves establishing a wireless bus between two electronic wireless stations, and at a receiving wireless station: receiving an incoming wireless signal from a wireless transmitting station via a wireless communication medium; initiating processing the signal for detecting if the signal comprises a wireless bus tracking signal; and if the signal comprises a wireless bus tracking signal, then ceasing further processing of the signal to conserve power.

The receiving wireless station may cease receiving a remainder of the wireless bus tracking signal and entering a power saving state. The transmitting wireless station may periodically generate a wireless bus tracking signal to maintain the wireless bus connected, the wireless bus tracking signal having a specified pattern, and transmit each wireless bus tracking signal over a wireless communication medium.

The wireless bus tracking signal may comprise an information frame without a data payload, the information frame including said specified signal pattern having a format distinguishable from data payload format. The receiving wireless station may detect if an incoming signal is a wireless bus tracking signal by detecting if the incoming information frame includes said specified signal pattern.

The specified signal pattern may comprise a signal pattern in a preamble portion of said information frame. The wireless network comprises a wireless personal area network. The wireless network comprises a mmWave wireless network. The wireless network may implement an IEEE 802.15.3c type protocol in which said specified pattern for wireless bus signal tracking signal comprises a "low-latency mode" bit set to "1" and an "aggregation" bit set to "0" in a physical (PHY) header for an IDLE-MAC Protocol Data Unit (MPDU) in said information frame, indicating a wireless bus signal tracking. The transmitting wireless station PHY layer may reduce power consumption in generating a wireless bus tracking IDLE-MPDU by skipping channel coding and other functions normally performed for payload of a non-bus tracking IDLE-MPDU. The receiving wireless station PHY layer may reduce power consumption in receiving a wireless bus tracking IDLE-MPDU by skipping the wireless medium channel de-coding and other functions for payload of a non-bus tracking IDLE-MPDU.

The wireless network may implement an IEEE 802.15.3c type protocol in which said specified pattern for wireless bus signal tracking signal comprises an extra bit added to the PHY header of an IDLE-MPDU in said information frame, indicating a wireless bus tracking signal.

These and other features, aspects and advantages of the present invention will become understood with reference to the following description, appended claims and accompanying figures.

DESCRIPTION OF THE INVENTION

The invention provides a method and system for power saving while maintaining a wireless bus alive in a wireless network.

Figure 1:
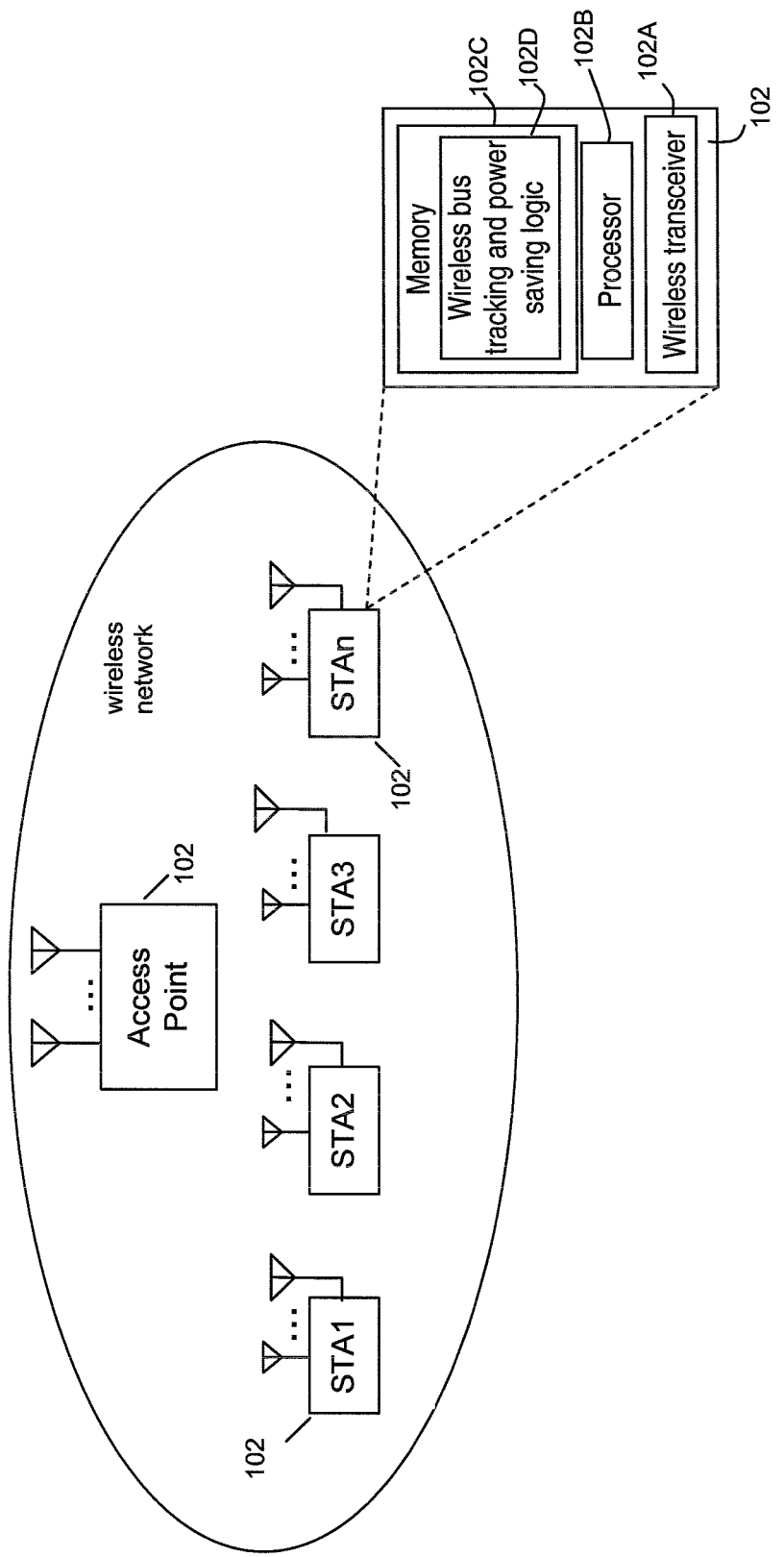
FIG. 1 shows a wireless system implementing power saving communication, according to an embodiment of the invention.

FIG. 1 shows a block diagram of an example wireless network 100 implementing a power saving process according to an embodiment of the present invention. The network 100 comprises multiple wireless stations 102 (e.g., n STAs 102) and may include an access point (AP). A plurality of the wireless stations 102 (e.g., cellular phone and a laptop) are power-saving wireless stations. A wireless station 102 may comprise a wireless transceiver 102A, processor 102B and memory 102C including wireless bus tracking and power saving logic 102D, according to an embodiment of the invention. The wireless bus tracking and power saving logic 102D is described according to embodiments of the invention further below.

If an AP is not present in the wireless network, then the wireless stations communicate with each other directly. In the presence of an AP, usually wireless stations do not communicate with one another directly if the network operates at the infrastructure mode. All frames are transmitted to the AP, and the AP transmits them to their destined wireless stations. Since the AP is forwarding all frames, the wireless stations are no longer required to be in range of one another. The only requirement is that the wireless stations be within range of the AP. In FIG. 1, as an example, if wireless station STA 1 sends a frame to STA 2, STA 1 first sends the frame to the AP, and the AP forwards the frame to STA 2.

The wireless communication medium (e.g., radio frequency (RF) channel) may be shared among different wireless stations 102 using Carrier Sense Multiple Access with Collision Avoidance (CSMA/CA) during the contention period (CP). In one example, a wireless bus is established between a pair of wireless stations and maintained connected (alive). The wireless bus is established when two wireless stations successfully exchange control messages for wireless bus setup. Different from PC bus, which is a hardware concept and has a physical medium between the two devices, wireless bus provides a virtual connection over a wireless channel.

According to the invention, power consumption is reduced by both a wireless transmitter and a wireless receiver while maintaining a wireless bus between them connected, by exchanging wireless bus tracking signals between the transmitter and receiver. The bus tracking signal is differentiated from the signal used to transmit actual data. For example, a specific signal pattern may be used by the transmitter to inform the receiver that a signal is a wireless bus tracking signal rather than a signal carrying actual data. This reduces signaling and processing for bus tracking signals at both the transmitter and the receiver.

Figure 2:
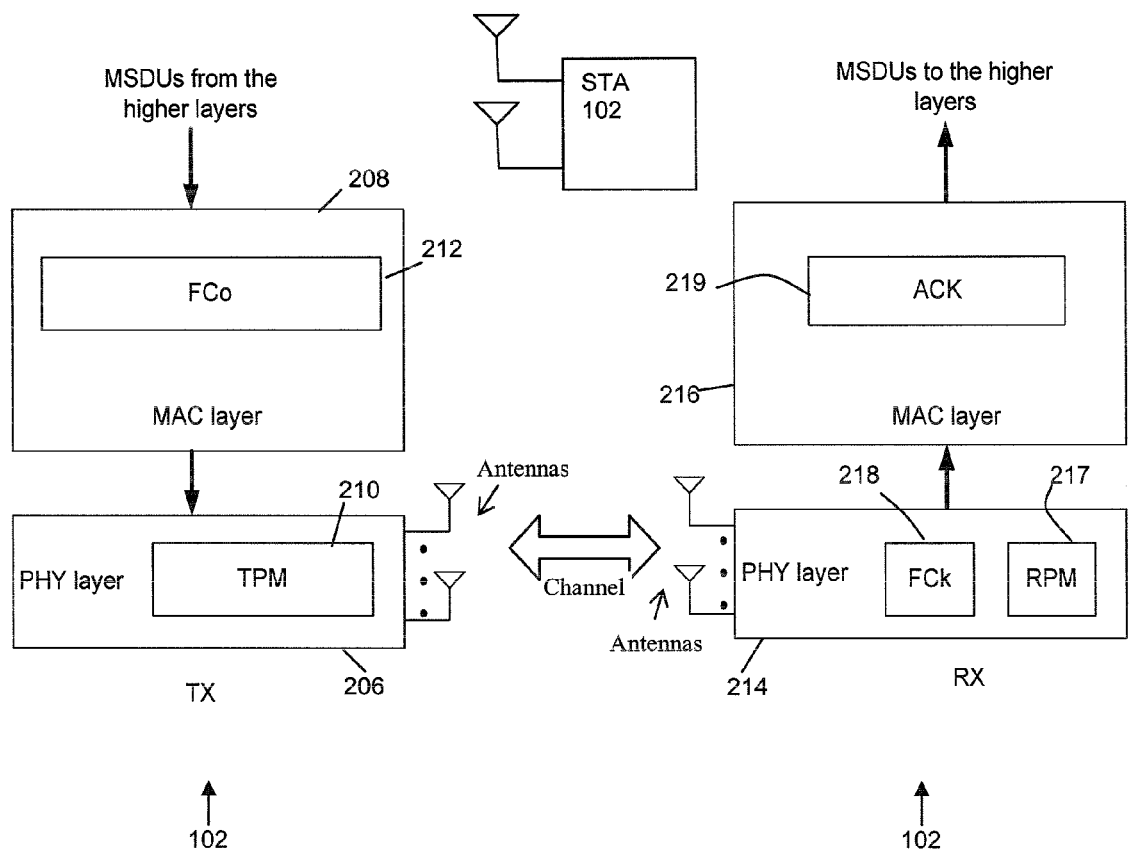
FIG. 2 shows a functional block diagram of a wireless system comprising a wireless transmitter (TX) and a wireless receiver (RX) implementing power saving communication for maintaining a wireless bus, according to an embodiment of the invention.

FIG. 2 shows a wireless network 200 of wireless stations 102 according to an embodiment of the invention. In this example a wireless station functions as a transmitter TX and another wireless station functions as a receiver RX. Although in the description of FIG. 2 the TX and RX have been shown separately, each is a type of wireless communication station capable of transmitting and/or receiving over a wireless channel in a wireless communication system. Therefore, a wireless communication station herein can function as a transmitter, a receiver, an initiator and/or a responder. It then follows that an AP can function as a transmitter, a receiver, an initiator and/or a responder.

The TX includes a PHY layer 206 and a media access control (MAC) layer 208, configured according to the invention. The RX includes a PHY layer 214 and a MAC layer 216, configured according to the invention. The TX and RX use a frame structure for data communication therebetween. For data communication (not bus tracking), the TX MAC layer 208 obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to the PHY layer 206 to attach a PHY header (i.e., PHY preamble) thereto to construct a PHY Protocol Data Unit (PPDU). The PHY header includes parameters for determining a transmission scheme including a coding/modulation scheme. Before transmission as a packet from the TX to the RX, a preamble is attached to the PPDU, wherein the preamble can include channel estimation and synchronization information.

For data communication (not bus tracking), the RX PHY layer 214 receives an incoming frame, decodes the payload and provides it to the MAC layer 216. When the MAC layer 216 receives the frame from the PHY layer 214, the MAC layer 214 then examines the MAC header of the frame to determine if it was intended for that receiver. As such, the MAC header of an incoming frame is examined after arrival of the frame payload (e.g., the MSDU) at the MAC layer 216 of the RX.

To keep the wireless bus alive, an implementation of a power saving process according to the invention involves the TX notifying the RX that the arriving packet is a wireless bus tracking signal, and reducing the packet processing at both TX and RX when performing wireless bus tracking. A wireless bus tracking signal may be only a frame preamble or preamble plus some header information instead of the whole packet, to save power for the purpose of wireless bus tracking. When wireless bus tracking signals are periodically transmitted, a wireless bus tracking process and power saving steps according to the invention reduce power consumption by the transmitter and receiver for each wireless bus tracking signal.

For the TX to notify the RX that the arriving packet is a wireless bus tracking signal, one implementation involves using a specific signal pattern, or a extra bit in the PHY header, or some specific combination value of some bits in the PHY header of a wireless bus tracking packet, to inform the RX that an incoming signal is a wireless bus tracking signal rather than a signal carrying actual data.

Further, when the RX receives a bus tracking signal (packet), the RX only processes the preamble and PHY header part of that packet, and skips the PHY payload, after the RX determines that the packet is a wireless bus tracking packet (and not an actual data packet). The RX may send the TX a feedback and acknowledge (ACK) packet. For each wireless bus tracking packet, the TX only transmits the preamble and optionally the PHY header of a packet but skips the PHY payload. During the time period that normally a PHY payload is to be transmitted, both the TX and RX enter a power saving mode (e.g., sleep mode). The MAC header need not be processed.

Specifically, the TX MAC layer 208 includes a frame constructor (FCo) function 212 and the TX PHY layer further includes a power management (TPM) function 210, wherein the TPM function 210 and the FCo function 212 are configured to provide power saving while keeping the wireless bus alive, as described further below. Further, the RX PHY layer 214 includes a frame checker (FCk) function 218 and a power management (RPM) function 217, and the RX MAC layer 216 further includes an acknowledge (ACK) function 219, wherein the RPM function 217, the FCk function 218 and the ACK function 219 are configured to provide power saving while keeping the wireless bus alive, as described further below.

An example implementation for IEEE 802.15 is now described. The IEEE 802.15 wireless personal area network (WPAN) protocol provides standards for short distance wireless networks, such as for wireless networking of consumer electronics and portable and mobile computing devices. The protocol enables such devices to communicate and interoperate with one another. The sub-clause 7.2.8.2 and 8.7a.2 of conventional IEEE 802.15.3c specification draft D02 describes a low-latency aggregation mechanism for wireless bus applications. To maintain the bus alive, IDLE-MPDUs are continuously sent out when there is no actual data (MSDUs). The PHY of the transmitter steps through the entire signal processing for the IDLE-MPDUs in the same way as for actual data MPDUs. In the MAC sub-header of the IDLE-MPDU, the header checksum (HCS) value of the MAC sub-header is inverted to ensure the MSDU HCS check fails at the receiver side. The receiver keeps searching for the next MAC sub-header with correct MSDU HCS if it meets an IDLE-MPDU. However, operations for processing IDLE-MPDUs (without actual data) at both the transmitter and receiver side are costly in terms of power consumption.

Specifically in said IEEE 802.15.3c specification D02, low-latency aggregation is indicated by both "low-latency mode" and "aggregation" bits setting to "1" in the PHY header. IDLE-MPDU also uses the same bit setting in its PHY header and uses the same aggregation frame format as actual data packets. For IDLE-MPDU, HCS for the MSDU sub-header at the transmitter side is set to a wrong value, and the Frame Convergence Sub-Layer (FCSL) layer of the receiver may skip IDLE-MPDUs by searching for MSDU sub-headers with correct HCS. However, the PHY layer of both the transmitter and the receiver are unaware whether a packet is an IDLE-MPDU or an actual data packet. Both the transmitter and the receiver perform all of the signal processing steps, which is a costly power consuming process. The IDLE-MPDU is treated the same as an actual data packet except HCS for MAC sub-header. A large amount of power is consumed to process and transmit/receive the IDLE-MPDUs at both the transmitter and the receiver. Further, a large amount of power is consumed (wasted) at the receiver to keep searching for next MSDU sub-header with correct HCS value. In the low-latency aggregation approach specified in IEEE 802.15.3c D02, when the FCSL layer of the receiver obtains MSDU part of an IDLE-MPDU, it does not need to distinguish whether it is actual data or IDLE-MPDU data. However, since the HCS of MSDU sub-header will fail for IDLE-MPDU, the receiver needs to keep searching and calculating HCS to find a MSDU sub-header with correct HCS. This causes extra power consumption at the transmitter and receiver to handle each IDLE-MPDU.

In one embodiment the invention provides a power saving mechanism that reduces power consumption at the transmitter and receiver. An example implementation of the power saving process according to the invention, and applicable to said IEEE 802.15.3c standard, is described below. The power saving process involves using an explicit indication of IDLE-MPDU for a wireless bus tracking signal packet. To reduce processing overhead for such an IDLE-MPDU packet, the TX PHY layers 206 and RX PHY layer 214 (FIG. 2) are notified of a specific indication on an IDLE-MPDU packet.

Figure 3:
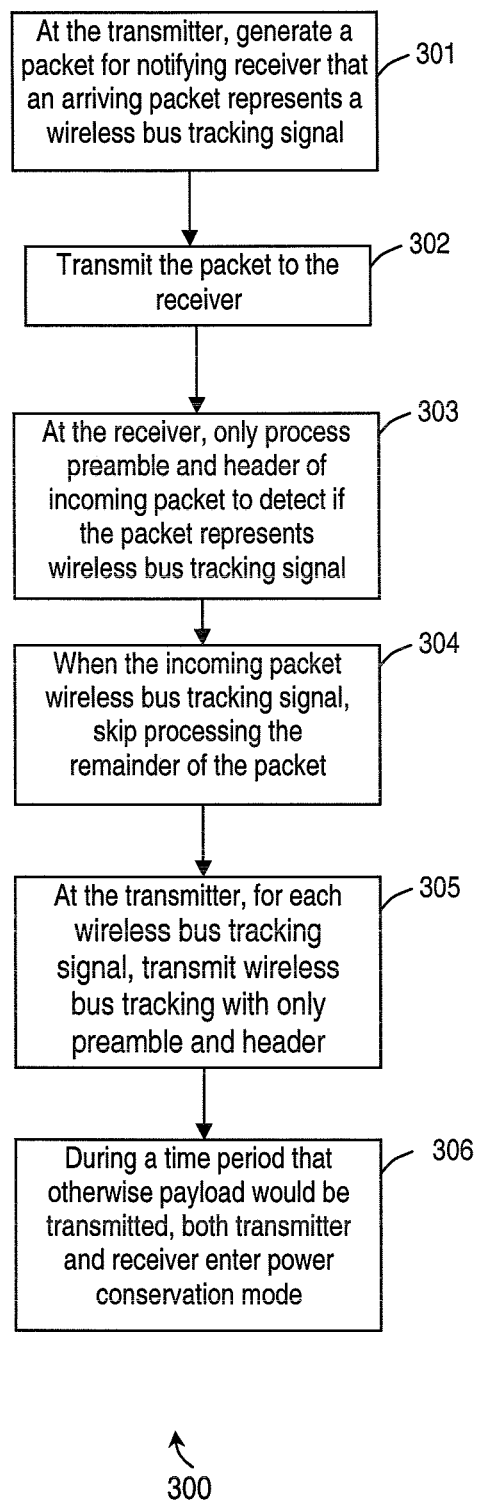
FIG. 3 shows a flowchart of a process implementing power saving communication for maintaining a wireless bus, according to an embodiment of the invention.

FIG. 3 shows a flowchart of a process 300 for a power saving wireless bus implementation according to an embodiment of the invention, which includes the following process blocks:

Block 301: The TX generates a wireless bus tracking packet for notifying the RX that an arriving packet represents a wireless bus tracking signal. One implementation involves using a specific signal pattern, or an extra bit in the PHY header, or some specific combination value of some bits in the PHY header, to inform the RX that an incoming signal packet is a wireless bus tracking signal packet rather than a signal carrying actual data. More specific to IEEE 802.15.3c, for notifying the RX that an arriving packet is a wireless bus tracking signal, a "low-latency mode" bit set to "1" and an "aggregation" bit set to "0" in the PHY header for wireless bus tracking signals (IDLE-MPDU) is used, according to an embodiment of the invention. Alternatively, an extra bit may be added to the PHY header to indicate that the packet is an IDLE-MPDU, according to an embodiment of the invention.

Block 302: The TX transmits the wireless bus tracking signal packet to the RX.

Block 303: The RX only processes the preamble and PHY header part of the incoming packet to detect if the packet represents a wireless bus tracking signal.

Block 304: When the incoming packet represents a wireless bus tracking signal, the RX skips the PHY payload. Optionally, the RX may send a feedback and acknowledge (ACK) packet to TX.

Block 305: Each time a wireless bus tracking packet signal needs to be transmitted, the TX only transmits the preamble, and optionally the PHY header, of the IDLE packet and skips PHY payload.

Block 306: During the time period that normally a PHY payload is to be transmitted, both the TX and RX enter power saving mode (e.g., sleep mode). The MAC header need not be processed.

As noted, an implementation of the power saving process for IEEE 802.15.3c involves using a new explicit indication of IDLE-MPDU to indicate a bus tracking packet. To reduce processing overhead for an IDLE-MPDU packet, the PHY layers at both the TX and the RX are notified of an IDLE-MPDU packet.

For example, a bus tracking signal may comprise a signal similar to a portion of the preamble or the entire PHY preamble (or a PHY preamble with just the PHY header), or a PHY preamble with both PHY header and MAC header (IDLE-MPDU). The bus tracking signal is differentiated from the signal used to transmit actual data. For example, a specific signal pattern, or an indicator in the PHY header, or an additional bit in the PHY header (or some specific combination value of some bits in the PHY header) may be used by the TX to inform the RX that a signal is a wireless bus tracking signal rather than a signal carrying actual data.

In one embodiment, the bus tracking signal need not be IDLE-MPDU, but may be: a part of the preamble or the entire preamble, or the PHY preamble with PHY header, or the PHY preamble with both PHY header and MAC header, or the PHY preamble with both PHY header, MAC header, and MAC payload. More specific to use in mmWave IEEE 802.15.3c, the tracking signal may comprise a PHY preamble and Base frame header. The Base frame header includes PHY header, MAC header, HCS, RS parity bits and padding bits. The wireless bus tracking signal may only include PHY preamble, PHY header, HCS, RS parity bits and padding bits. In addition, the wireless bus tracking signal may only comprise a PHY preamble or part of a PHY preamble to further reduce the TX, RX power consumption for wireless bus tracking.

Figure 4:
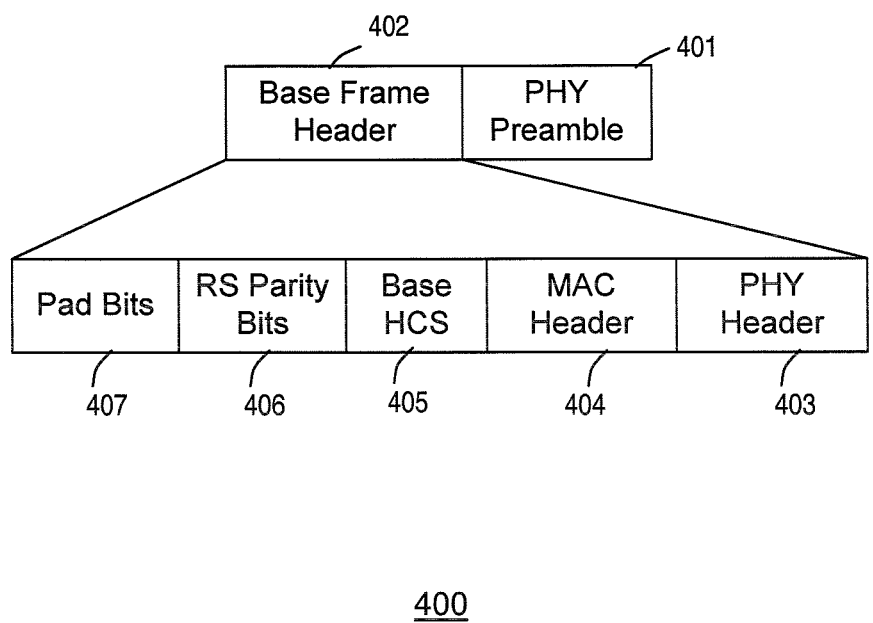
FIG. 4 shows a communication frame format for implementing power saving communication for maintaining a wireless bus, according to an embodiment of the invention.

FIG. 4 shows a PPDU format 400 for wireless bus tracking signal and procedure according to an embodiment of the invention. The wireless bus tracking PPDU format 400 includes a PHY preamble 401 and a Base frame header 402. The Base frame header 402 includes a PHY header 403, MAC header 404, Base HCS 405, RS parity bits 406 and padding bits 407. Now also referring to FIG. 2, the TX MAC layer frame constructor (FCo) 212 generates the MAC header 404 information as discussed above, and passes that information to the TX PHY layer 206. The TX PHY layer 206 adds the PHY preamble 401, a PHY header 403, a base HCS 405, RS parity bits 406 and padding bits 407, to form a PPDU packet for the wireless bus tracking signal.

An embodiment of the invention provides setting a "low-latency mode" bit to "1" and an "aggregation" bit to "0" in the PHY header 403 for IDLE-MPDUs. At TX, when the MAC layer 212 passes an IDLE-MPDU packet to its PHY layer 206, the MAC layer 212 informs the PHY layer 206 that the packet is an IDLE-MPDU packet by passing the "low-latency mode" and "aggregation" parameters to the PHY layer 206, or by passing the MPDU type parameter as "IDLE-MPDU" via PHY Service Access Point (PHY-SAP) to the PHY layer 206. The TX PHY layer TPM 210 takes steps to reduce power consumption for an IDLE-MPDU. For example, the TX PHY layer 206 can skip the channel coding and other functions for the payload of the IDLE-MPDU packet to conserve power.

The PHY layer 206 then transmits the wireless bus tracking PPDU packet out on a wireless medium (e.g., RF channel).

When the RX PHY layer 214 receives a PPDU packet, the frame checker (FCk) 218 checks the PHY header 403 to detect if the packet is a wireless bus tracking PPDU packet. Once a wireless bus tracking PPDU packet is detected, the RX PHY layer 214 passes the MAC header 404 of that packet to the RX MAC layer 216. In this way the wireless bus remain connected even thought the wireless tracking signal PPDU has no data payload to be processed (conserving power). The RX may optionally include an acknowledge (ACK) function 219 that generate an ACK MPDU and pass it to the RX PHY layer 214 to transmit back to the TX (in that case, in a PPDU packet that carries the ACK MPDU back to the TX, the "low-latency mode" bit is set to "1" and the "aggregation" bit is set to "0" in the PHY header).

In one example, the RX FCk function 218 analyzes the PHY header of a received packet, wherein the PHY layer can determine whether the packet is an IDLE-MPDU packet by checking "low-latency mode" and "aggregation" bits that are set by the TX as described. Then, the RX PHY layer RPM function 217 takes steps to reduce power consumption at RX for an IDLE-MPDU (e.g., RX PHY layer can skip the channel de-coding and other functions for the payload of the IDLE-MPDU). Instead of passing the un-decoded IDU-MPDU payload to the RX MAC layer 216, the RX PHY layer 214 can notify the RX MAC layer 216 that an IDLE-MPDU is received at the PHY layer 214 and only pass the MAC header information to the MAC layer 216. An alternative is to add an extra bit to the PHY header to indicate that the packet is an IDLE-MPDU. In this approach, both "low-latency mode" and "aggregation" bits are set to "1" in the PHY header.

The TX transmits the wireless bus tracking PPDU periodically, rather than back-to-back, to maintain the wireless bus alive (connected). If there are no actual data packets to be transmitted at the moment, the interval between two consecutive wireless bus tracking PPDUs can be decided based on the channel condition. With this approach the power consumption for wireless bus tracking is reduced.

Figure 5:
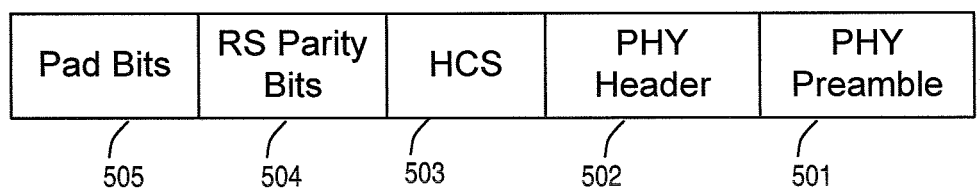
FIG. 5 shows another communication frame format for implementing power saving communication for maintaining a wireless bus, according to an embodiment of the invention.

FIG. 5 shows an example wireless bus tracking PPDU format 500 involving a further reduced frame format by taking advantage of directional transmission of mmWave wireless technology. The frame format 500 includes PHY preamble 501, PHY header 502, HCS 503, RS parity bits 504 and padding bits 505. If the transmitter and the receiver use a narrow beam to communicate with each other, the MAC header can be skipped and the signal direction can be used to identify the transmitter. At the TX PHY layer, if no MPDUs are received from the TX MAC layer for a time period, the TX PHY layer of the transmitter generates a wireless bus tracking PPDU and transmits that packet on the wireless channel. When the RX PHY layer receives and checks the PHY header, detecting that the received is a wireless bus tracking PPDU, the RX PHY layer generates a same PPDU and transmits it back to the TX as an ACK. With this approach the power consumption of wireless bus tracking is further reduced.

Furthermore, the wireless bus tracking signal (packet) may include only a PHY preamble or part of a PHY preamble to further reduce the power consumption for wireless bus tracking. In this case, the preamble may have a specific signal pattern to be differentiated from the preamble for other data packets.

As such, according to embodiments of the invention, generally to maintain tracking a wireless bus to ensure it is alive (connected), the two wireless stations (transmitter and receiver) need to exchange tracking signals periodically if there is no actual data transmitted between the two wireless stations. The tracking signal can be a signal similar to a part of the preamble or the whole preamble, or the PHY preamble with PHY header, or the PHY preamble with both PHY header and MAC header, or an IDLE-MPDU. The format of bus tracking signal should be differentiated from the formats of other signals used to transmit real data. A specific signal pattern, or an extra bit in the PHY header, or some specific combination value of some bits in the PHY header can help to let the receiver know it is a wireless bus tracking signal rather than a signal carrying real data.

This makes the present invention suitable for such applications as mobile devices, portable devices, consumer electronics devices and other devices which can benefit from power conservation, such as battery operated wireless device.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product", are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof; however, other versions are possible. Therefore, the spirit and scope of the appended claims should not be limited to the description of the preferred versions contained herein.

What is claimed is:

1. A power saving method for communication in a wireless network, comprising:
    establishing a wireless bus between two electronic wireless stations;
    at a receiving wireless station:
        receiving an incoming wireless signal from a transmitting wireless station including information indicative of a signal pattern in a first portion of the incoming wireless signal via a wireless communication medium;
        initiating processing of the first portion of the incoming wireless signal for detecting if the incoming wireless signal comprises a wireless bus tracking signal based on the information indicative of the signal pattern; and
        if the incoming wireless signal comprises a wireless bus tracking signal, then processing a preamble and ceasing further processing of a second portion of the incoming wireless signal to conserve power, wherein the wireless bus tracking signal is different from a data signal.

2. The method of claim 1 further comprising:
    the receiving wireless station ceasing receiving a remainder of the wireless bus tracking signal and entering a power saving state.

3. The method of claim 1 further comprising, at the transmitting wireless station:
    periodically generating a wireless bus tracking signal to maintain the established wireless bus connected, the wireless bus tracking signal having a specified signal pattern; and
    transmitting each wireless bus tracking signal over the wireless communication medium.

4. The method of claim 3 wherein:
    at the transmitting wireless station, generating a wireless bus tracking signal comprises generating an information frame without a data payload, the information frame including said specified signal pattern having a format distinguishable from data payload format; and
    at the receiving wireless station detecting if an incoming wireless signal comprises a wireless bus tracking signal further comprises detecting if the information frame includes said specified signal pattern.

5. The method of claim 4 wherein said specified signal pattern comprises a signal pattern in a preamble portion of the information frame.

6. The method of claim 5 wherein the wireless network comprises a wireless personal area network.

7. The method of claim 5 wherein the wireless network comprises a mmWave wireless network.

8. The method of claim 5 wherein the wireless network implements a IEEE 802.15.3c type protocol in which said specified pattern for the wireless bus tracking signal comprises a "low-latency mode" bit set to "1" and an "aggregation" bit set to "0" in a physical (PHY) header for an IDLE-MAC Protocol Data Unit (MPDU) in said information frame, indicating a wireless bus tracking signal packet.

9. The method of claim 8 wherein:
    a transmitting wireless station PHY layer reduces power consumption in generating a wireless bus tracking IDLE-MPDU by skipping channel coding and other functions normally performed for payload of a non-bus tracking IDLE-MPDU; and
    a receiving wireless station PHY layer reduces power consumption in receiving a wireless bus tracking IDLE-MPDU by skipping wireless medium channel de-coding and other functions for payload of a non-bus tracking IDLE-MPDU.

10. The method of claim 5 wherein the wireless network implements a IEEE 802.15.3c type protocol in which said specified pattern for the wireless bus signal tracking signal comprises an extra bit added to the PHY header of an IDLE-MPDU in said information frame, indicating a wireless bus tracking signal.

11. A wireless communication system, comprising:
    a transmitting wireless station configured for generating a wireless bus tracking signal to maintain a wireless bus connected, the wireless bus tracking signal having a specified pattern indicative of signal pattern in a first portion of the wireless bus tracking signal, and transmitting each wireless bus tracking signal over a wireless communication medium;
    a receiving wireless station configured for:

receiving an incoming wireless signal from a transmitting wireless station via the wireless communication medium;

initiating processing of the first portion of the incoming wireless signal for detecting if the incoming wireless signal comprises a wireless bus tracking signal based on the specified pattern; and if the incoming wireless signal comprises a wireless bus tracking signal, then processing a preamble and ceasing further processing of a second portion of the incoming wireless signal to conserve power, wherein the wireless bus tracking signal is different from a data signal.

12. The system of claim 11 wherein the wireless receiving station is further configured for ceasing receiving a remainder of the wireless bus tracking signal and entering a power saving state.

13. The system of claim 12 wherein:

the transmitting wireless station is further configured for generating a wireless bus tracking signal by generating an information frame without a data payload, the information frame including said specified pattern having a format distinguishable from data payload format; and the receiving wireless station is further configured for detecting if an incoming wireless signal is a wireless bus tracking signal further comprises detecting if the incoming information frame includes said specified pattern.

14. The system of claim 13 wherein said specified pattern comprises a signal pattern in a PHY preamble portion of said information frame.

15. The system of claim 14 wherein the system includes a wireless network that comprises a wireless personal area network.

16. The system of claim 14 wherein the system includes a wireless network that comprises a mmWave wireless network.

17. The system of claim 14 wherein the system includes a wireless network that implements a IEEE 802.15.3c type protocol in which said specified pattern for the wireless bus tracking signal comprises a "low-latency mode" bit set to "1" and an "aggregation" bit set to "0" in a physical (PHY) header for an IDLE-MAC Protocol Data Unit (MPDU) in said information frame, indicating a wireless bus tracking signal packet.

18. The system of claim 17 wherein:

the transmitting wireless station includes a PHY layer configured for reducing power consumption in generating a wireless bus tracking IDLE-MPDU by skipping channel coding and other functions normally performed for payload of a non-bus tracking IDLE-MPDU; and the receiving wireless station includes a PHY layer configured for reducing power consumption in receiving a wireless bus tracking IDLE-MPDU by skipping wireless medium channel de-coding and other functions for payload of a non-bus tracking IDLE-MPDU.

19. The system of claim 14 wherein the system includes a wireless network that implements a IEEE 802.15.3c type protocol in which said specified pattern for the wireless bus signal tracking signal comprises an extra bit added to a PHY header of an IDLE-MPDU in said information frame, indicating a wireless bus tracking signal.

20. A wireless station, comprising:
a wireless transceiver;
a processor;
a computer usable medium having a processor readable program code embodied therewith, wherein the processor readable program code when executed on the processor causes the processor to:

periodically generate a wireless bus tracking signal to maintain a wireless bus connected, the wireless bus tracking signal having a specified preamble pattern, the wireless bus tracking signal comprising an information frame without a data payload, the information frame including said specified preamble pattern having a format distinguishable from data payload signal format;

if a signal comprises a wireless bus tracking signal, processing a preamble of the wireless bus tracking signal and transmit the wireless bus tracking signal over a wireless communication medium via the wireless transceiver by skipping further processing of the wireless bus tracking signal including channel coding and other functions normally performed for payload of a non-bus tracking information frame, wherein the wireless bus tracking signal is different from a data signal.

21. A wireless station, comprising:
a wireless transceiver;
a processor;
a computer usable medium having a processor readable program code embodied therewith, wherein the processor readable program code when executed on the processor causes the processor to:

receive an incoming wireless signal from a wireless transmitting station including information indicative of signal pattern in a first portion of the wireless signal over a wireless communication medium via the wireless transceiver;

initiate processing of the first portion of the wireless signal for detecting if the wireless signal comprises a wireless bus tracking signal based on the information; and if the wireless signal comprises a wireless bus tracking signal, then processing a preamble of the wireless bus tracking signal and cease receiving and further processing of a second portion of the wireless bus tracking signal, and entering a power saving state, wherein the wireless bus tracking signal is different from a data signal.

22. The method of claim 1, wherein if the incoming wireless signal comprises a wireless bus tracking signal, the receiving wireless station only processing the preamble of the wireless bus tracking signal.

23. The method of claim 1, wherein if the incoming wireless signal comprises a wireless bus tracking signal, the receiving wireless station additionally processing a physical (PHY) header of the wireless bus tracking signal.

24. The method of claim 1, wherein if the incoming wireless signal comprises a wireless bus tracking signal, both the transmitting wireless station and the receiving wireless station enter a power saving mode.

25. The method of claim 1, wherein the first portion of the incoming wireless signal comprises one or more of a preamble and a physical (PHY) header.

26. The method of claim 25, wherein the second portion of the incoming wireless signal comprises a payload.

27. The method of claim 26, wherein the payload comprises a PHY payload.

28. The method of claim 27, wherein the PHY payload comprising channel coding and other functions normally performed for a payload of a non-bus tracking information frame.

29. The method of claim 1, wherein the first portion comprises one or more of the preamble and a header, and the second portion comprises a payload.

30. The method of claim 29, wherein if the incoming wireless signal comprises a wireless bus tracking signal, the receiving wireless station processing the preamble and the header of the wireless bus tracking signal and skipping processing of the payload.

31. The method of claim 29, wherein for each wireless bus tracking packet, the transmitting wireless station only transmits the preamble.

32. The method of claim 29, wherein for each wireless bus tracking packet, the transmitting wireless station transmits the preamble and the header.

* * * * *